(12) United States Patent
Bolin et al.

(10) Patent No.: US 10,902,052 B2
(45) Date of Patent: Jan. 26, 2021

(54) SEARCH RESULTS THROUGH IMAGE ATTRACTIVENESS

(71) Applicant: MICROSOFT TECHNOLOGY LICENSING, LLC, Redmond, WA (US)

(72) Inventors: Mark Robert Bolin, Carnation, WA (US); Ning Ma, Redmond, WA (US); Aleksandr Livshits, Sammamish, WA (US); Alexey Volkov, Bellevue, WA (US); Pawel Michal Pietrusinksi, Sammamish, WA (US); Houdong Hu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 333 days.

(21) Appl. No.: 15/935,521

(22) Filed: Mar. 26, 2018

(65) Prior Publication Data

US 2019/0294703 A1 Sep. 26, 2019

(51) Int. Cl.
*G06F 16/248* (2019.01)
*G06F 16/58* (2019.01)
*G06N 3/08* (2006.01)
*G06F 7/02* (2006.01)

(52) U.S. Cl.
CPC .............. *G06F 16/58* (2019.01); *G06F 7/02* (2013.01); *G06F 16/248* (2019.01); *G06N 3/08* (2013.01)

(58) Field of Classification Search
CPC ...... G06F 16/58; G06F 16/583; G06F 16/248; G06F 7/02; G06F 16/00

USPC .......................................................... 707/748
See application file for complete search history.

(56) References Cited

U.S. PATENT DOCUMENTS

| | | | | |
|---|---|---|---|---|
| 8,352,465 | B1* | 1/2013 | Jing | G06F 16/54 |
| | | | | 707/723 |
| 8,595,257 | B1* | 11/2013 | Ovide | G06Q 50/01 |
| | | | | 707/784 |
| 8,843,478 | B1* | 9/2014 | Jing | G06F 16/285 |
| | | | | 707/723 |
| 9,116,921 | B2* | 8/2015 | Jing | G06F 16/9535 |

(Continued)

OTHER PUBLICATIONS

Bianco, et al., "On the use of deep learning for blind image quality assessment", In Journal of Signal, Image and Video Processing, Aug. 31, 2017, pp. 1-8.

(Continued)

*Primary Examiner* — Hanh B Thai
(74) *Attorney, Agent, or Firm* — International IP Law Group, PLLC

(57) ABSTRACT

Systems and methods for identifying search results in response to a search query are presented. More particularly, images are selected as search results, at least in part, according to an attractiveness value associated with the images. Upon receiving a search query, a set of content is identified according to the query intent of the search query and includes at least one image. The identified set of content is ordered according an overall score determined according to relevance and, in the case of the at least one image, according to an attractiveness value. A search results generator selects items from the set of content according to their overall scores, including the at least one image, generates a search results page, and returns the search results page to the requesting party.

20 Claims, 10 Drawing Sheets

(56) References Cited

U.S. PATENT DOCUMENTS

| | | | | |
|---|---|---|---|---|
| 9,805,061 | B2* | 10/2017 | Chang | G06F 16/583 |
| 10,235,387 | B2* | 3/2019 | Zhu | G06F 16/583 |
| 10,353,947 | B2* | 7/2019 | Soni | G06F 16/54 |
| 2003/0200188 | A1* | 10/2003 | Moghaddam | G06K 9/6256 706/25 |
| 2012/0059838 | A1* | 3/2012 | Berntson | G06F 16/951 707/759 |
| 2014/0250110 | A1* | 9/2014 | Yang | G06F 16/583 707/723 |
| 2014/0358916 | A1* | 12/2014 | Anand | G06F 16/9038 707/732 |
| 2015/0169635 | A1* | 6/2015 | Jing | G06F 16/50 707/723 |
| 2016/0140144 | A1* | 5/2016 | Chang | G06F 16/583 382/190 |
| 2016/0179889 | A1* | 6/2016 | Chiang | G06F 16/24545 707/718 |
| 2016/0283483 | A1* | 9/2016 | Jiang | G06F 16/248 |
| 2017/0255647 | A1* | 9/2017 | Zhu | G06F 16/285 |
| 2017/0294010 | A1* | 10/2017 | Shen | G06K 9/6256 |
| 2017/0308552 | A1* | 10/2017 | Soni | G06F 16/58 |
| 2018/0039638 | A1* | 2/2018 | Krivokon | G06F 16/3322 |
| 2018/0061459 | A1* | 3/2018 | Song | H04N 21/4828 |
| 2019/0080250 | A1* | 3/2019 | Denorme | G06N 3/0427 |

OTHER PUBLICATIONS

Bosse, et al., "A deep neural network for image quality assessment", In Proceedings of IEEE International Conference on Image Processing, Sep. 25, 2016, 5 Pages.

Burges, et al., "Learning to rank using gradient descent", In Proceedings of the 22nd international conference on Machine learning, Aug. 7, 2005, pp. 89-96.

Datta, et al., "Studying aesthetics in photographic images using a computational approach", In Proceedings of European Conference on Computer Vision, May 7, 2006, 14 Pages.

Deng, et al., "Imagenet: A large-scale hierarchical image database", In Journal of Computer Vision and Pattern Recognition, Jun. 20, 2009, 8 Pages.

Dhar, et al., "High level describable attributes for predicting aesthetics and interestingness", In Journal of Computer Vision and Pattern Recognition, Jun. 20, 2011, pp. 1657-1664.

Geng, et al., "The role of attractiveness in web image search", In Proceedings of the 19th ACM International Conference on Multimedia, Nov. 28, 2011, pp. 63-72.

Ioffe, et al., "Batch normalization: accelerating deep network training by reducing internal covariate shift", In Proceedings of the 32nd International Conference on International Conference on Machine Learning, vol. 37, Jul. 6, 2015, pp. 1-11.

Jin, et al., "Image aesthetic predictors based on weighted cnns", In Proceedings of IEEE International Conference on Image Processing, Sep. 25, 2016, 5 Pages.

Kang, et al., "Convolutional neural networks for no-reference image quality assessment", In Proceedings of IEEE Conference on Computer Vision and Pattern Recognition, Jun. 23, 2014, 8 Pages.

Kao, et al., "Visual aesthetic quality assessment with a regression model", In Proceedings of IEEE International Conference on Image Processing, Sep. 27, 2015, pp. 1583-1587.

Ke, et al., "The design of high-level features for photo quality assessment", In Proceedings of IEEE Computer Vision and Pattern Recognition, Jun. 17, 2006, 8 Pages.

Kong, et al., "Photo aesthetics ranking network with attributes and content adaptation", In Proceedings of European Conference on Computer Vision, Oct. 8, 2016, pp. 1-24.

Larson, et al., "Most apparent distortion: full reference image quality assessment and the role of strategy", In Journal of Electronic Imaging, vol. 19, Issue 1, Jan. 2010, 21 Pages.

Lu, et al., "Deep multi-patch aggregation network for image style, aesthetics, and quality estimation", In Proceedings of IEEE International Conference on Computer Vision, Dec. 7, 2015, 9 Pages.

Lu, et al., "Rapid: Rating pictorial aesthetics using deep learning", In Proceedings of the 22nd ACM International Conference on Multimedia, Nov. 3, 2014, pp. 457-466.

Luo, et al., "Content-based photo quality assessment", In Proceedings of IEEE Transactions on Multimedia, Voume 15, Issue 8, Jun. 19, 2013, 8 Pages.

Luo, et al., "Photo and video quality evaluation: Focusing on the subject", In Proceedings of European Conference on Computer Vision, Oct. 12, 2008, pp. 386-399.

Ma, et al., "A-lamp: Adaptive layout-aware multi-patch deep convolutional neural network for photo aesthetic assessment", In Proceedings of Conference on Computer Vision and Pattern Recognition, Jul. 21, 2017, 10 Pages.

Mai, et al., "Composition-preserving deep photo aesthetics assessment", In Proceedings of IEEE Conference on Computer Vision and Pattern Recognition, Jun. 27, 2016, pp. 497-506.

Marchesotti, et al., "Assessing the aesthetic quality of photographs using generic image descriptors", In Proceedings of IEEE International Conference on Computer Vision, Nov. 6, 2011, pp. 1784-1791.

Murray, et al., "AVA: A largescale database for aesthetic visual analysis", In Proceedings of IEEE Conference on Computer Vision and Pattern Recognition, Jun. 16, 2012, 8 Pages.

Nishiyama, et al., "Aesthetic quality classification of photographs based on color harmony", In Proceedings of IEEE Conference on Computer Vision and Pattern Recognition, Aug. 22, 2011, pp. 33-40.

Pedro, et al., "Leveraging user comments for aesthetic aware image search reranking", In Proceedings of the 21st international conference on World Wide Web, Apr. 16, 2012, pp. 439-448.

Talebi, et al., "Nima: Neural image assessment", In Journal of Computing Research Repository, Sep. 2017, pp. 1-13.

Xue, et al., "Learning without human scores for blind image quality assessment", In Proceedings of IEEE Conference on Computer Vision and Pattern Recognition, Jun. 23, 2013, pp. 995-1002.

* cited by examiner

SEARCH RESULTS THROUGH IMAGE ATTRACTIVENESS

BACKGROUND

Using search engines as a means of finding information or content regarding some topic or person (or more generally, an entity) is a ubiquitous online activity. On a daily basis, millions of people submit search queries to search engines, such as Bing® or Google, in their quest to get desired content. Early iterations of search engines primarily responded to search queries with one or more search results pages, each page comprising a list of hyperlinks to content related to the search query, with each element in the list (called a snippet) showing some portion of the linked-to content. Now, search engines may respond with search results pages that include snippets, information tables, and images, all relating to the person's query intent.

In addition to requesting content relevant to a query, there is a general assumption that the person is most likely requesting the latest, most "fresh," information to the subject matter/intent of the query. For example, if a person were to submit a search query, "who were the Grammy winners?", most likely that person is not interested in finding who were the Grammy winners from 6 years past, but the most recent Grammy winners. Thus, search engines, in their efforts to identify relevant content to a query and without specific instructions to the contrary, will typically factor in a "freshness" or recent element to the calculus.

Empirical studies indicate that, in addition to relevance and freshness, people want aesthetically pleasing search results. Search results pages that are relevant, fresh and aesthetically pleasing tend to increase user engagement with the search engine. Increased user engagement leads to increased revenue for a search engine.

Aesthetically pleasing search results pages are typically organized in some manner that the desired content is readily accessed and identified. Images have a part in the content organization. Indeed, images that are relevant to the subject matter of a search query can add to the overall aesthetical value of a search results page. However, not all images, including recent or "fresh" images, that may be relevant to a topic are aesthetically pleasing.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods for identifying search results in response to a search query are presented. More particularly, images are selected as search results, at least in part, according to an attractiveness value associated with the images. Upon receiving a search query, a set of content is identified according to the query intent of the search query and includes at least one image. The identified set of content is ordered according an overall score determined according to relevance and, in the case of the at least one image, according to an attractiveness value. A search results generator selects items from the set of content according to their overall scores, including the at least one image, generates a search results page, and returns the search results page to the requesting party.

According to additional aspects of the disclosed subject matter, a computer-implemented method for responding to a search query is presented. The method includes receiving a search query from a computer user and, in response, determining a query intent of the search query. From the query intent, a set of content related to the query intent is identified. The set of content includes at least one image related and/or relevant to the search query. An overall score is determined for each item of the set of content. This overall score is determined according to a relevance value of an item to the query intent, and in the case of an image (including the at least one image) is further determined according to an image attractiveness value of the image. A search results page is generated according to the overall scores, where the search results page includes the at least one image, and the search results page is returned to the requesting party.

According to further aspects of the disclosed subject matter, a computing system implementing a search engine configured to respond to a search query is presented. The computing system includes both a processor and a memory, where the processor executions instructions retrieved from the memory in implementing the search engine. The computing system further comprises an executable intent identifier, an executable content retrieval component, and an executable results ranking component. In execution, the intent identifier operates to evaluate a search query received from a computer user to determine a query intent of the received search query. The content retrieval component then identifies a set of content related to the query intent from a content store. According to aspects of the disclosed subject matter, the set of content comprises at least one image. The results ranking component determines an overall score for each item of the set of content. This overall score is determined according to a relevance value of the item to the query intent. Additionally, the overall score of the least one image is further scored according to an image attractiveness value. The search results page generator then generates a search results page according to the overall scores, where the search results page includes the at least one image.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
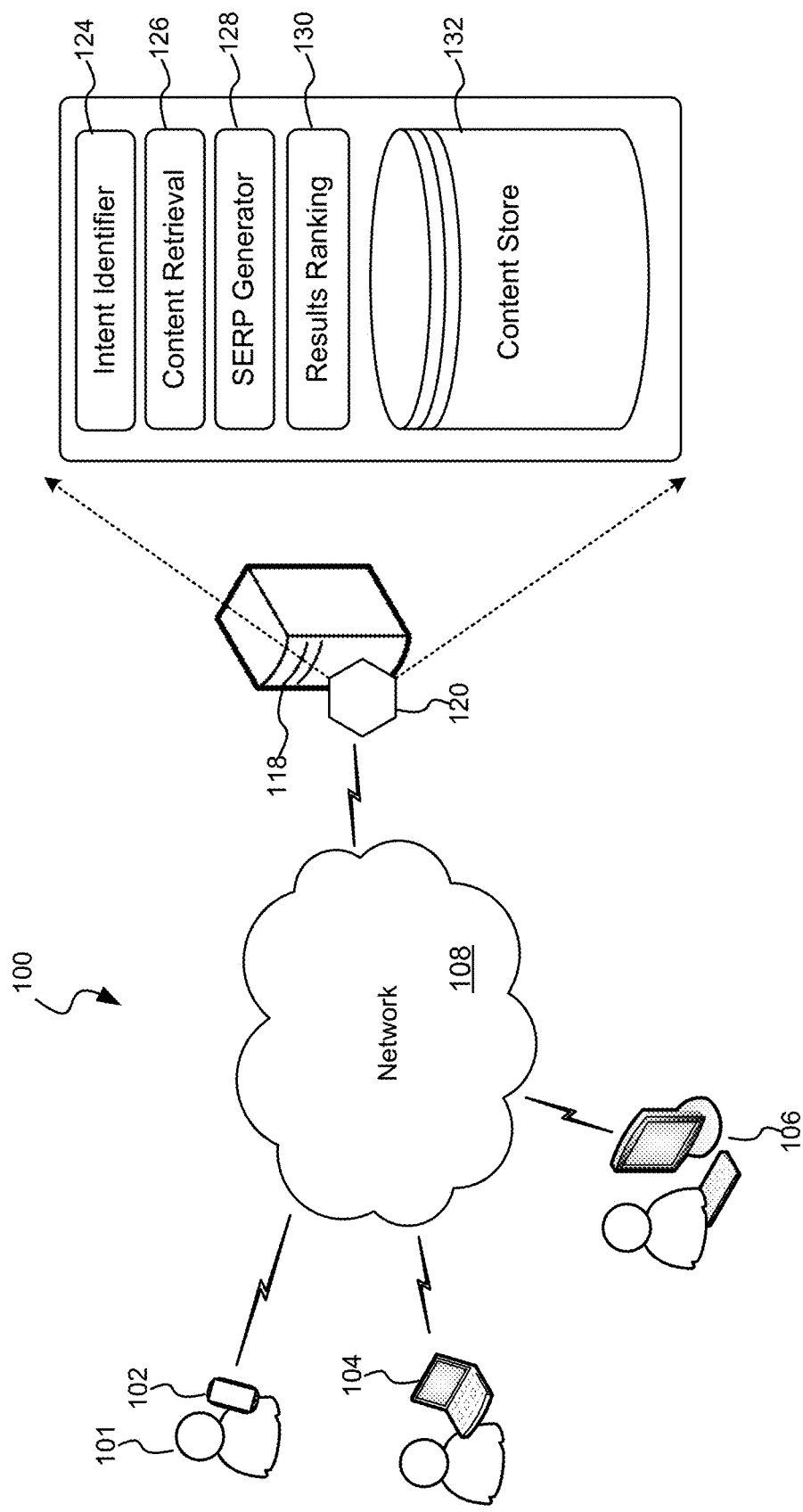
FIG. 1 is a block diagram illustrating an exemplary network environment suitable for implementing aspects of the disclosed subject matter.

As indicated above, unless otherwise specified, people expect relevant, informative, fresh, and aesthetically pleasing search results pages in response to any given search query. Image content often plays a part in the aesthetics of a search results page. As suggested above, including aesthetically pleasing images in a search results page enhances the overall aesthetics of a search results page, typically resulting in increased user engagement. In contrast, including images that are not aesthetically pleasing will often result in the submitting party disliking the search results page that, as a consequence, leads to decreased user engagement or even the loss of a customer. Accordingly, it is important to generate a search results page, especially one that includes one or more images, that strikes a balance of relevance, freshness and aesthetically pleasantness. Aspects of the disclosed subject matter are directed to achieving this balance.

According to various aspects of the disclosed subject matter and as will be discussed in further detail below, in response to receiving a search query, at least one entity and/or intent of the search query is determined. Based on the identified intent(s), Relevant content to this entity is identified within a content store. According to aspects of the disclosed subject matter, this relevant, identified content includes one or more images that are relevant to the search query. In addition to their relevance to the search query, the identified image content is scored in regard to image attractiveness. Regarding the attractiveness of a given image, an attractiveness score is determined for that image content according to an executable attractiveness model for determining a likely or predicted attractiveness of a given image. This attractiveness score, as well as relevance scores and freshness scores, are normalized and combined according to various heuristics to determine an overall score associated with a corresponding item of content. A search results generator then selects at least some of the content according to the overall score, to generate one or more search results pages.

According to various aspects of the disclosed subject matter, the executable attractiveness module for determining image attractiveness is an executable model that is the product of a machine learning process. This machine learning process is derived from a corpus of image pairs that are manually curated to identify which image is "more attractive." Once trained, the attractiveness module is applied to generate an attractiveness score for a given image which, as discussed above, is used in conjunction with a freshness score and a relevance score to determine an overall score for an item of content as a search result item, particularly in regard to image content.

For purposes of clarity and definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

By way of definition and clarity, the term "entity" refers to an identifiable thing, e.g., a person, a place, an organization, a cause, a concept, etc. An entity is the focus (or one of the foci) of a search query. In considering a search query as a combination of nouns and verbs, an entity is a noun, an action or request regarding the entity is a verb, and the combination of the two would be the intent of the query. In regard to a simple query, "define computer," the entity would be "computer," the action would be "to define," and the intent would be to provide a definition for the term/entity "computer."

The term "freshness" refers to a newly touched-on interest in or recently-occurred event relating to some aspect of an entity. Stated differently, freshness refers to content that is new (or recent) and/or dynamic in nature which provides people (computer users) a motivation to review, investigate, and/or consider.

A search query should be viewed as a request submitted to a search engine for content relevant and relating to the subject matter and/or user intent of the search query. The search query defines the subject matter and user intent of the request. Typically, though not exclusively, a search query is a text-based request that includes one or more search terms and/or parameters that, collectively, define the subject matter and intent of the query. In some embodiments, a search query may comprise other content, such as an image, where the content is the subject matter of the query and the intent may be implied by the request (i.e., when submitting an image to a search engine, an implied intent may be that the user is requesting links to similar images.)

Turning to the figures, FIG. 1 is a block diagram illustrating an exemplary network environment 100 suitable for implementing aspect of the disclosed subject matter. As shown in FIG. 1, the network environment 100 includes one or more user devices, such as user devices 102-106, by which a person/computer user (such as computer user 101) may submit a search query to a search engine 120 over a network 108, where the search engine 120, in execution on the computing system 118, operates as an online process for responding to search queries. The search engine 120 operates on one or more server or cloud computing devices, such as computing system 118, that includes the various hardware and interfaces necessary to interface with the network 108 and receive search queries from one or more remotely located computer users (via user devices.)

Suitable user devices for submitting search queries to an online search engine include, by way of illustration and not limitation, mobile phone devices (such as mobile phone 102), digital assistant devices, tablet computing devices, laptop computers (such as laptop computer 104), desktop computers (such as desktop computer 106), smartwatches, and the like. Generally speaking, suitable user devices include, or provide for, a user-interface by which a corresponding computer user submits a search query to the online search engine 118 (via a user device) and, in response, receives and reviews search results to the search query.

As will be appreciated by those skilled in the art, the network 108, also referred to as a computer network, comprises a telecommunication platform over which a plurality of network-enabled devices and/or computers are interconnected or linked such that they are able to communicate with each other, exchange commands, and share data, hardware and/or other resources. There are a number of networks available, the most common of which is the Internet. The Internet is, of course, a communication network and interconnects devices worldwide global scope, linked by a broad array of electronic, wireless, and/or optical networking technologies. As will be appreciated, the Internet operates according to an Internet protocol suite, and carries a vast range of information resources and services, such as the inter-linked hypertext documents and applications of the World Wide Web, electronic mail, telephony, and file sharing.

The search engine 120 comprises various logical and/or executable components or modules, including an intent identifier module 124, a content retrieval module 126, a SERP (SEarch Results Page) generator 128, and a results ranking module 130. Also, typically maintained by a search engine 120 is a content store 132. Typically, though not exclusively, the content store 128 comprises an indexed data store referencing content that may be provided to a computer user in response to search query. According to various embodiments of the disclosed subject matter, the content store may store items of content (e.g., text content, audio content, images, video content, data, etc.) that may be provided to a computer user in response to a search query. Additionally or alternatively, the content store may include references or hyperlinks (e.g., uniform resource locators or URLs and/or uniform resource identifiers or URIs) to content. In operation, the intent identifier 124 determines the user intent of a received search query, a content retrieval module 126 obtains content from the content store in response to the search query, the results ranking module 130 determines a score for the various items of content that have been accessed or retrieved in response to the search query, and the SERP generator 128 generates one or more search results according to the obtained content. Typically, though not exclusively, the SERP generator selects the highest scoring content for inclusion in first search results pages presented to the computer user, in a manner that items of content that are deemed to be the highest scoring content are presented first to the computer user over content that is deemed less high scoring. According to aspects of the disclosed subject matter, the SERP generator 128 selects a first image over a second image due, at least in part, to the higher attractiveness score of the first image as compared to the second image.

Figure 2:
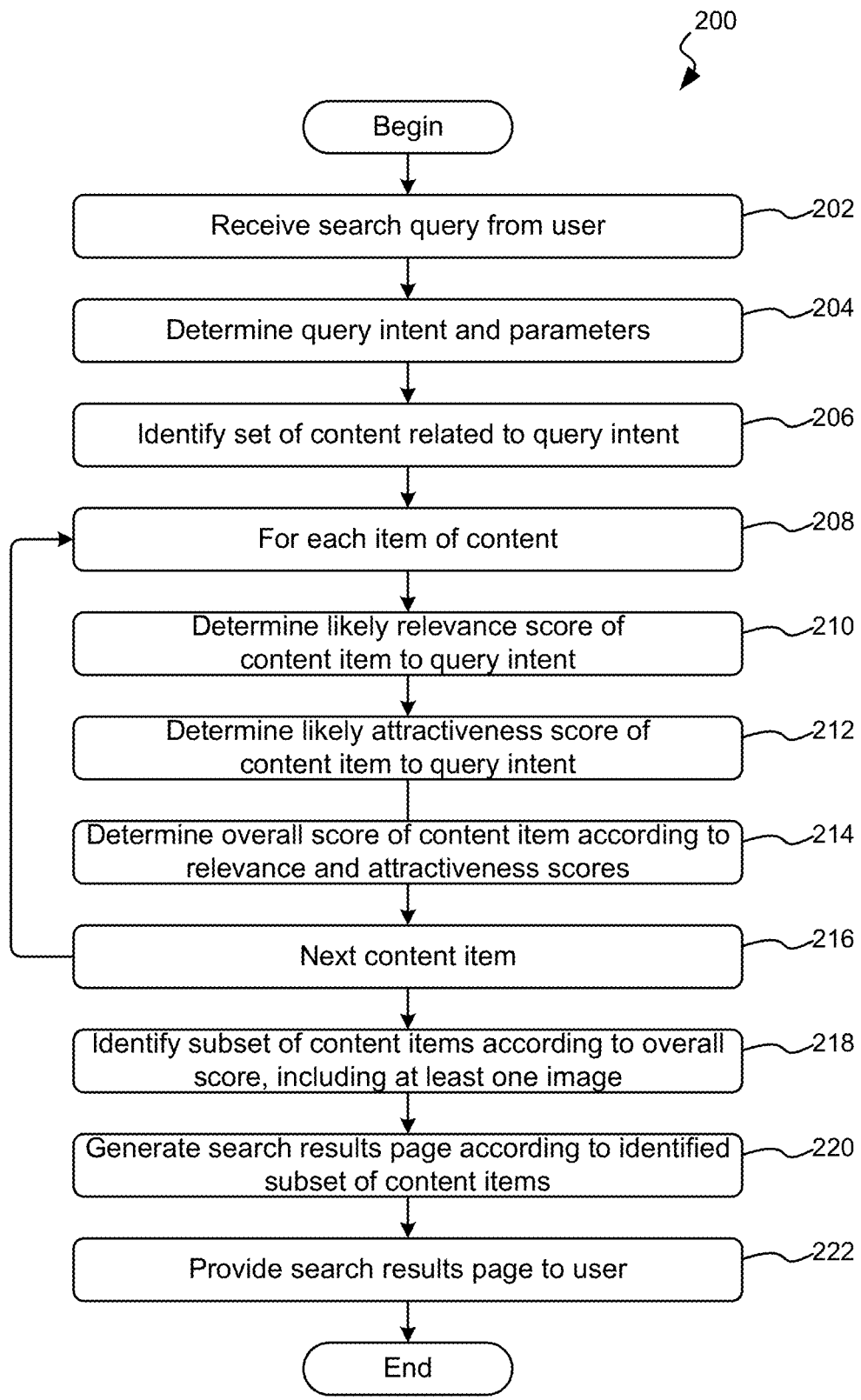
FIG. 2 is a flow diagram illustrating an exemplary routine suitable for providing search results to a search query in accordance with aspects of the disclosed subject matter.
Figure 3:
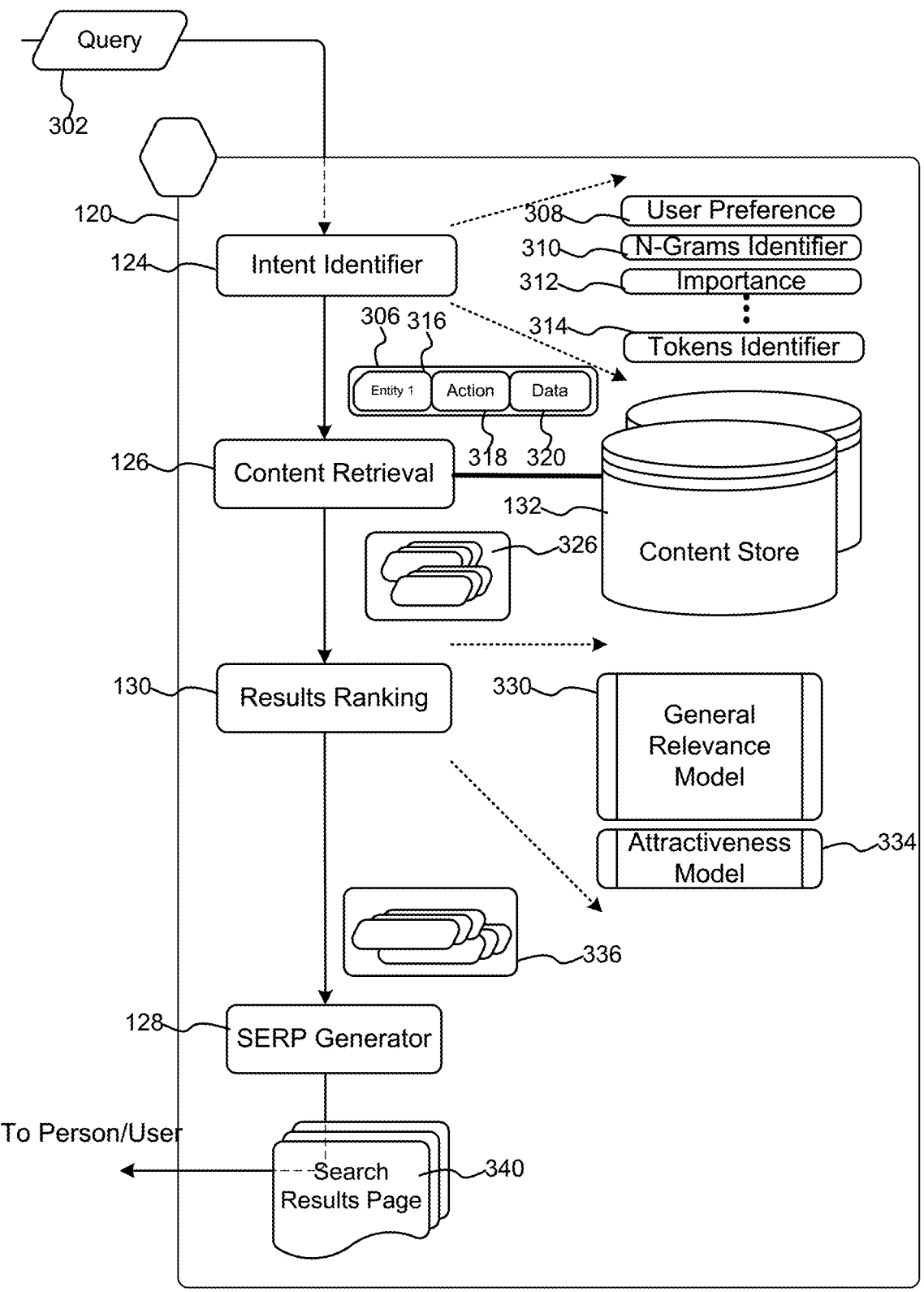
FIG. 3 is a block diagram illustrating an exemplary processing by a search engine in responding to a search query in accordance with aspects of the disclosed subject matter.

Turning to FIGS. 2 and 3, FIG. 2 is a flow diagram illustrating an exemplary routine 200, as may be implemented by a search engine 118, for responding to a search query from a computer user in accordance with aspects of the disclosed subject matter. Additionally, FIG. 3 is a block diagram illustrating exemplary processing 300 by a search engine in responding to a search query in accordance with aspects of the disclosed subject matter.

Beginning at block 202, the search engine 120 receives a search query 302 from a computer user, such as computer user 101 of FIG. 1. Upon receipt of the search query and at block 204, the search engine 120 identifies the query intent 306 of the computer user. As suggested above, the query intent includes the subject matter of the query as well as any parameters that may have been provided, either explicitly or implicitly that condition the query intent. As shown in FIG. 3, an executable intent identifier 124 processes the search query to identify the query intent 306 of the computer user, comprising an entity 316, and action to be taken 318, and data 320 for modifying or clarifying the query's intent.

Identifying the query intent 306 of a user's search query, as carried out by the intent identifier 124, typically comprises multiple concurrent or near-concurrent processes that must quickly execute to in order to provide relevant query results in order to respond to the requesting computer user in a reasonable amount of time. Indeed, all of the components of the search engine 120 must quickly execute in order to provide search results to the computer user in, what appears to be, a near-instantaneous manner.

Regarding the identification of the query intent and by way of illustration and example, the intent identifier component 124 utilizes and/or comprises a plurality of executable modules. As shown in FIG. 3 for illustration and exemplary purposes, these modules may include a user preference module 308 that identifies user preferences with regard to choices that may be made by the overall intent identification process (block 204), an n-grams identifier module 310 that converts the textual components of the search query to n-grams that may be used to map the search query to one or more user intents, an executable importance module 312 that associates importance weightings with the various entities that may be identified by the search query, and an executable tokens identifier module 314 that parses the search query for the various tokens (as may be determined according to white space and/or punctuation) for use in identifying the various elements of the search query. The results of each of the executable modules is processed and combined by the intent identifier module 124 to determine the query intent 306 of the search query 302 that comprises an entity 316 (which corresponds to the subject matter of the query), a desired action 318 (corresponding to the action of the query to be carried out—e.g., obtain content), and data 320 (corresponding to additional data and parameters that add additional context and meaning to the query intent.) Of course, these modules for identifying the query intent 306 are illustrative of many modules that may be executed concurrently (or near-concurrently) to identify the query intent 306 and may or may not be utilized in a given embodiment.

At block 206, based on the identified query intent 306, the search engine 120 identifies or retrieves content related to the query intent. As shown in FIG. 3, an executable content retrieval module 126 identifies and/or retrieves content from one or more content stores, such as content store 132, resulting in an identified set of content 326. As will be appreciated by those skilled in the art, the content store 132 comprises content obtained and/or identified from numerous network-accessible sites on the network 108. As those skilled in the art will appreciate, gathering such content is typically the province of a so-called Internet spider or Web crawler, that searches throughout the Internet/network for content. Information regarding the "located" content is typically stored in an index, where the content store 132 is an indexed content store suitable for ready and rapid access according to various key terms and phrases (typically corresponding to entities). Snippets that describe the items of content in the content store 132 may also be associated with the corresponding content in the content store. The items of content stored in the content store may comprise copies of the items located throughout the network and/or references (e.g., URLs—uniform resource locators—and URIs—uniform resource identifiers) to these items of content located throughout the network 108. According to aspects of the disclosed subject matter, the identified set of content 326 includes one or more images.

Logically, after having identified the set of content 326, at block 208, an iteration loop is begun to iterate through each item of identified content to associate an overall score with each item of content of the set of content 326. As part of this scoring process, at block 210 and with regard to a currently iterated item content of the set of content 326, an overall, general relevance score is determined for the item of content. Typically, though not exclusively, this relevance score is determined according to the strength the topic of the item of content to the query intent 306. This strength may further reflect the popularity of the item of content to the entity according to a plurality or population of users, as determined by user interaction with the item of content under similar query conditions (e.g., when this or a similar query is received and this item of content is displayed, a large portion of the population interacts in some manner with the item of content.) Other factors utilized in determining a score for a currently iterated item of content may include, by way of illustration and not limitation, user preferences with regard to the entity 316, user supplied parameters, and the like. According to one embodiment of the disclosed subject matter, this relevance score may be determined by a plurality of computer-implemented heuristics and/or according to an executable machine learning general relevance model 330 trained to identify a relevance score of an entity 316 with regard to an item of content.

Additionally, though not exclusively, the relevance score may be further based on a freshness score for the currently iterated item of content. This freshness score reflects the freshness of the currently iterated item of content. As indicated above, when people submit search queries to a search engine, and unless they specify to the contrary, people are almost always interested in the latest information regarding the subject matter of the query, i.e., "fresh" information. To ensure that the latest, most fresh information regarding the query intent 306 is identified, one or more heuristics are executed and applied to the item of content to identify a corresponding freshness score. These heuristics include determinations according to creation date, recent usage/viewing trends, growing distribution, and the like. Alternatively, an executable, a machine learning freshness model, trained through machine learning processes to identify a likely freshness score of the currently iterated item of content may be used.

At block 212 and in further addition to the relevance and freshness scores, and according to aspects of the disclosed subject matter, an executable attractiveness model 334 is applied/executed to the currently iterated item of content, particularly when the item of content is an image. The attractiveness model generates a likely attractiveness score of an image that can be subsequently used in identifying the most relevant and aesthetically appealing items of content for presentation to the requesting computer user in response to the search query. As above, the attractiveness model 334 may be implemented as an executable machine learning model to generate the attractiveness score, where the model is trained and implemented according to machine learning processes, as discussed below.

At block 214, the various scores relating to the currently iterated item of content are combined according to one or more heuristics (and/or according to an executable machine learning model) as implemented by an executable results ranking module 328. The results ranking module 328 normalizes, weights and combines the various generated scores according to predetermined criteria and functions to determine an overall score for the currently iterated item of content. User preferences may also be considered and applied as weighting values to any of all of the various scores. By way of illustration and example, when the item of content is an image, the scores are normalized and combined such that 60% of the score is derived from the relevance score, 20% of the score is derived from the freshness score, and 20% of the score is based on the attractiveness score. Of course, any suitable combination of relevance, freshness and attractiveness may be used in a given implementation.

After determining an overall score for the currently iterated item of content, at block 216, a next item of content for processing is selected and the routine 200 returns to block 208. Alternatively, if there are no additional items of content to process, the routine 200 proceeds to block 218.

With the identified items of content being associated with an overall score (as indicated by the scored items of content 336), at block 218, a subset of the content items is identified or selected. This selection is made according to the overall scores of the items of content, as well as the type of content that is desired to generate a search results page. According to aspects of the disclosed subject matter, this identified subset of content items includes at least one image that was selected according to an overall score, where the overall score was based, at least in part, according to an attractiveness score.

At block 220, a search results page is generated according to the items of content in the identified subset of content items. As shown in FIG. 3, a SERP (SEarch Results Page) generator 128 accesses the scored items of content 336, selects a subset of items of content according to their scores (where the best scoring items are generally selected over those that have a lesser score), and generates at least one search results page 340. At block 222, the generated search results page is then provided to the requesting user in response to the search query. Thereafter, the routine 200 terminates.

Advantageously, scoring images according to attractiveness enables the overall scoring (as described in regard to block 216) to filter out images that, though relevant and fresh, are less than attractive. Consider, by way of illustration, a search query in regard to a request for images corresponding to a famous person. Famous people often release official images that have been professionally take and that best and most attractively present that famous person. Of course, there are often also images of that same famous person that are not authorized but taken by third parties. Moreover, many of these "unauthorized" images may capture a moment or pose or unfortunate situation that presents that person as unattractive or in an unflattering condition. In another example, a person searching for images of a particular sports car is likely not interested in images of the car covered in dirt or having a dent in a fender. Nor is the person likely interested in images that are blurry and/or out of focus—even if they are recent images. Instead, the user is likely seeking for images that are clear, sharp, colorful, and show the car in an attractive manner. As empirical studies suggest, most often, when searching for images, users often are looking for the best, most attractive images (unless specific information regarding a situation may be specified.) Thus, as a benefit and advantage of the disclosed subject matter, images are rated according to attractiveness, which leads to unattractive images receiving lower overall scores. In selecting content for search results pages, items (including images) that have the greatest scores are selected for the first search results pages in an effort to present the most relevant, fresh and attractive content to the user and soon as possible (i.e., in the first search results page.)

Figure 4:
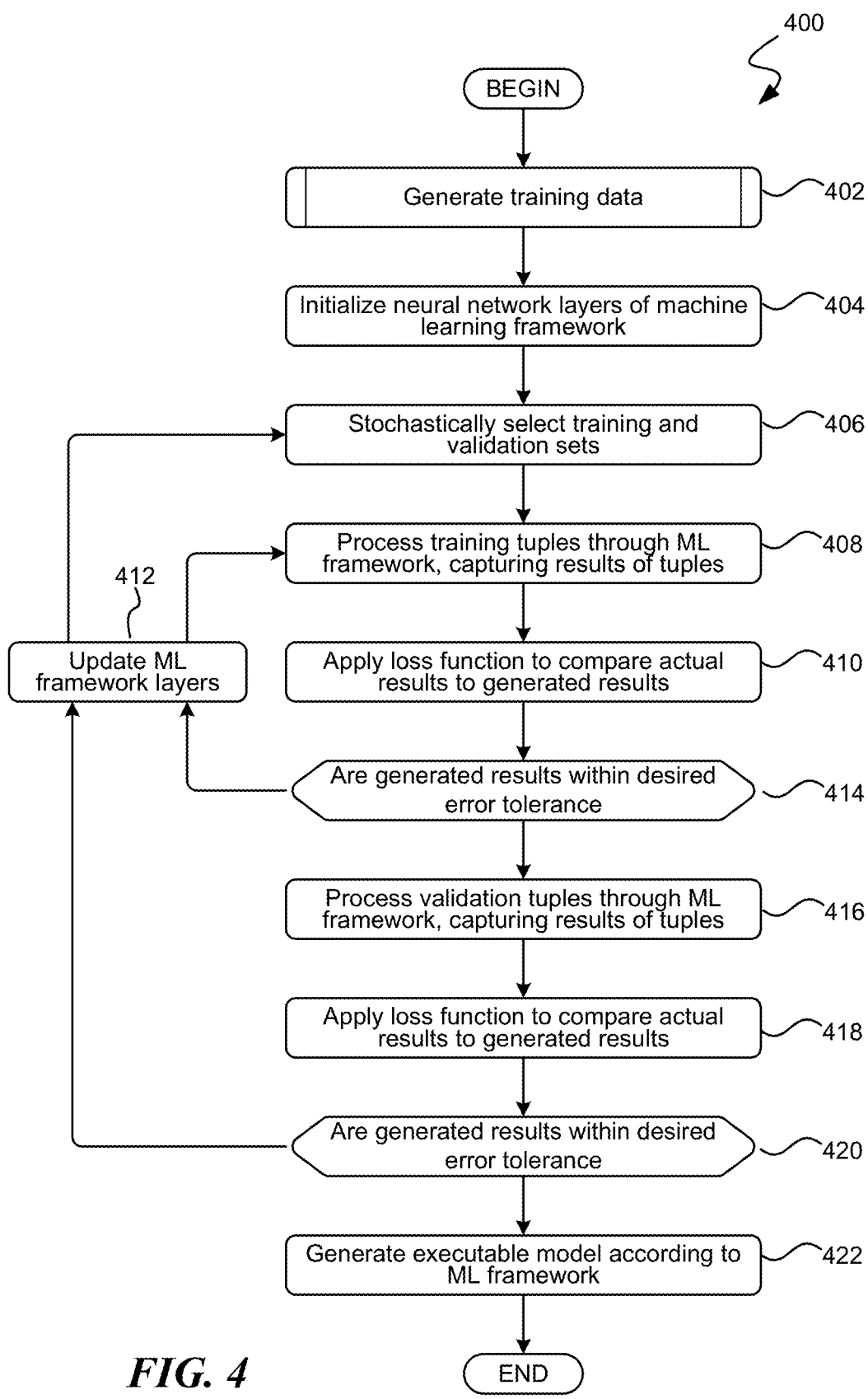
FIG. 4 is a flow diagram illustrating an exemplary routine suitable for generating a machine learning model suitable for determining a likely attractiveness score for a given image.

Regarding the scoring of image attractiveness and as suggested above, the attractiveness model 334 may be implemented as an executable model derived from a machine learning process. FIG. 4 is a flow diagram illustrating an exemplary routine 400 for generating a machine learning attractiveness model 334 suitable for determining a likely attractiveness score for a given image. Beginning at block 402, training data for training the attractiveness model 334 is generated.

Regarding generating the training data, as those skilled in the art will appreciate, in order to properly train a machine learning model to predict likely image attractiveness, a suitable set of training data is required. Generally speaking the training data comprises samples (e.g., sample images) and corresponding results, e.g., an attractiveness score. While a typical, common solution would be to have a judge assign an absolute attractiveness score to a large corpus of images to generate the learning sample, associating an absolute attractiveness score to an image is a highly subjective task and is not easily scaled to large quantities of images, as may be needed for a sample learning set. Rather than rely on one or more judges to subjectively associate an absolute attractiveness score to each of a corpus of images, a novel method for determining image attractiveness is set forth.

In accordance with aspects of the disclosed subject matter, a corpus of images is curated through side-by-side rations of image pairs. More particularly, image pairs are presented to a judge, along with selection criteria for identifying relative attractiveness between the two images. Advantageously, rather than associating an absolute attractiveness value, the judge only determines which is more attractive. Regarding the selection criteria, a judge is presented with a fixed set of evaluations from which the judge must select one. In one non-limiting embodiment, the selection criteria comprise 5 options that correspond to: "Left image is more attractive," "Left image is slightly more attractive," "Images are equally attractive," "Right image is slightly more attractive," and "Right image is more attractive."

In order to prevent a left/right bias in judging/evaluating the attractiveness of images, a determination as to which image is presented on the left and on the right is stochastically determined. Additionally or alternatively, the images may be presented in a first arrangement (e.g., image1 on left and image2 or right), and then reversed before the judge makes a determination. As yet a further alternative or addition, images may be flipped and/or rotated such that no particular arrangement and/or orientation is favored among image pairs.

In addition to the particular arrangement of image pairs, image pairs that are to be judged are selected according to like or similar subject matter. Accordingly, the corpus of sample images is organized or clustered into groups based on common subject matter. In one embodiment, an image in a first group may also reside in more than one group, due to commonality of subject matter in the image to plural groups/clusters.

Figure 5:
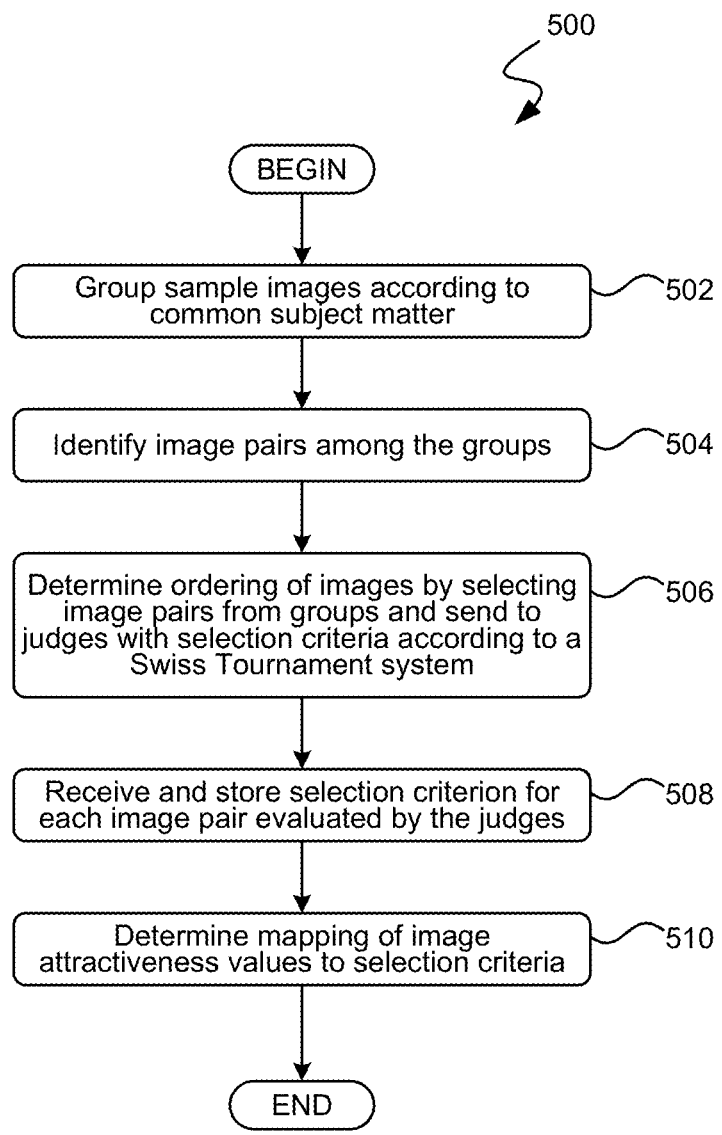
FIG. 5 is an exemplary flow diagram for operating a judging process to generate a corpus of learning data for training an attractiveness model, suitable for implementing aspects of the disclosed subject matter.

Turning to FIG. 5, an exemplary flow diagram for operating a judging process 500 to generate a corpus of learning data is presented. In operation, at block 502, the judging process first groups or clusters the images according to common subject matter. Grouping images according to subject matter may be based according to metadata associated with the images, according to predetermined classifications associated with the images, based on content identifications techniques, and the like. At block 504, the images within the groups are organized according to a first set of image pairs.

At block 506, the judging process 500 determines an order among the images by conducting a Swiss Tournament system using human judges. In this, the judging process selects a set of image pairs from a group of the sample image corpus, and the image pairs are presented to one or more human judge along with the selection criteria. According to one embodiment, the presentation of the images and selection criteria are made in conjunction with controls that can present the images in a side-by-side manner, swap the ordering of the images, rotate and/or flip the images, present the selection criteria to the judge, accept input regarding a selection of relative attractiveness, and return the information to the judging process 500.

At block 508, for each image pair sent to a judge, the judging process receives a selection of the selection criteria from that judge and stores the images. The image pair and corresponding "rating" (i.e., the selected criterion) are recorded for reference in regard to training a machine learning model.

Regarding the selection of image pairs as discussing in block 506, as will be appreciated by those skilled in the art, a challenge of evaluating side-by-side images is coverage: i.e., that for a corpus of N image pairs, fully rating/judging all image pairs against each other would require $N^2$ evaluations. In large groups within the sample data, fully rating each image pair against all other image pairs in the group is likely very expensive and time consuming, particularly in regard to the number ($N^2$) of evaluations that must be completed. Furthermore, due to the associative nature of the evaluations, many image pair evaluations are obvious and therefore unnecessary. For example, if Image A is identified as being more attractive than Image B in evaluation, and Image C is identified as being less attractive than Image B in evaluation, a strong assumption can be made that Image A is more attractive than Image C such that the evaluation of this pair by a judge becomes moot.

To provide sufficient image comparison/evaluation coverage without requiring evaluation of all $O(N)^2$ images, and according to aspects of the disclosed subject matter, a pairing method resembling a Swiss tournament system is utilized by the judging process 500. A Swiss tournament is a non-eliminating tournament format which features a set number of rounds of competition, but considerably fewer than would be required in a round-robin tournament needed for fully evaluating all $O(N^2)$ pairs. Indeed, in a Swiss tournament, each image is not evaluated against all other image in the group. Instead, images are paired in each round using a set of rules designed to ensure that each image is evaluated against other images with a same or similar running score. In the tournament, a pair of images are not compared against each other more than on time, but all images of a group are paired with another image in the group in each round.

During evaluation/judging and as part of the tournament, each image of a pair of images will receive a score according to the following: if the image is judged as being "more attractive" than the other image, that image receives a score of 3 for the round; if the image is judged as being "slightly more attractive" than the other image, that image receives a 1 for the round; otherwise the image receives a 0 for the round. After each round, the images are ordered (with the group) according to their current scores. For the next round, images are paired within the group according their scores, where the top two scoring images are paired against each other, the next two highest scoring images are paired against each other, etc. If there are more than two images of the same score to pair, random pair selection is made except that no two images are paired against each other more than once.

Typically, $\log_2$ N tournament rounds are conducted on groups of images, where N is the number of images in the group. The aggregate score for an image from each round is the image's overall score. The winner of the tournament (i.e., the most attractive image) is the image with the highest aggregate points/running score earned from all rounds.

Advantageously, the overall image scores provide a basis of ordering the images in a group according to attractiveness, where the highest scoring image of a group is considered the most attractive of that group. Advantageously, this score/ordering is made without assigning an absolute value from an arbitrary scale (which means nothing except to differentiate between the attractiveness of two images) to each image.

In addition to conducting the Swiss tournament to identify relative ordering for the various images, at block 510 a mapping is determined, to map image attractiveness values to selection criteria, used by a loss function in determining the accuracy of the machine learning neural network. This mapping is made to map a delta between an attractiveness score between the two images of an image pair to the selection criteria provided by the judge in the side-by-side evaluation/judgement. After determining the mapping, the routine 500 terminates.

Returning to FIG. 4, with the sample learning set of data comprising scored images pairs with corresponding evaluation criteria, a machine learning neural network may be trained to determine an attractiveness rating for a given image, such that $f(x_1)>f(x_2)$ indicates that image $x_1$ is more attractive than image $x_2$, where $f(x_n)$ (i.e., the output of the machine learning neural network) produces an attractiveness score for the image $x_n$.

At block 404, the various neural network layers of the machine learning mode to be trained are initialized, including the association and weighting of hyperparameters. As those skilled in the art will appreciate, these algorithms include dimension reductions, combinatorial operations, input transformation operations, gradient descent techniques, Newton's method algorithms and Quasi-Newton's method algorithms, conjugate gradient techniques, Levenberg-Marquardt algorithms, and the like. The results of nodes of each layer may be binary or sigmoid.

At block 406, from the sample learning data, both a training set and validation set of images pairs (with corresponding relative attractiveness evaluations as determined by one or more judges) are stochastically identified, where the training set is used to train the machine learning neural network and the validation set is used to validation the results of the machine learning neural network trained by the training set.

After having initialized the neural network and identified both training and validation sets, the training process of the neural network begins. At block 408, the training sets are processed by the neural work: processing a first image of an image pair, and then a second of the image pair, and recording/capturing the results—i.e., the likely attractiveness scores of each image. After processing the training set, at block 410 a loss function compares the results output by the machine learning framework against the actual results as determined by the judge (or judges). The loss function determines an error rate with regard to the output results in view of the judge results. At block 414, a determination is made as to whether the error rate of the machine learning neural network is within a predetermined error tolerance.

If the error rate is not within a desired error tolerance, the routine 400 proceeds to block 412. At block 412, the algorithms and/or hyperparameters of the layers of the machine learning neural network are updated and the process is repeated. Updating the various layers of a neural network may include, by way of illustration and not limitation, modifying hyperparameters and/or weightings for hyperparameters for the processing nodes of a given layer, updating weighting values with regard to input parameters, modifying threshold values for determining outputs of processing nodes of the neural network layers, and the like. Of course, as those skilled in the art will appreciate, updating the various layers of the neural network are typically made in small increments, which may result in many iterations of learning, but also advantageously result in fine tuning of the processing of the various layers to obtain improved results.

After updating the layers of the neural network, the routine returns to block 408 to again process the training set. This training continues until, at block 414, the determination is made that the error rate of the machine learning neural network (with regard to the test set) is within the desired error tolerance.

Once the desired error tolerance is achieved, at block 416 the validation set is processed by the current neural network and the results are captured. At block 418, the loss function determines an error rate for the validation set. More particularly, the loss function indicates determines the error rate according to the difference between the judged image pairs and the likely attractiveness scores as corresponding to the labeling criteria as determined by the label boundaries. At block 420, a determination is made as to whether the output (with regard to the validation set) of the machine learning neural network is within the desired error tolerance. If not, the routine 400 proceeds to block 412, where the machine learning neural network is again updated as described above. Thereafter and according to various embodiments of the disclosed subject matter, the routine 400 returns to block 406 where the training and validation sets are stochastically reorganized, resulting in new training and validation sets. Thereafter, the routine continues processing anew, beginning with the newly defined training set.

Processing/training of the neural network continues until, at block 420, the determination is made that the output of the machine learning neural network falls within the desired error tolerance. At block 422, a trained, executable machine learning model (i.e., an attractiveness model 334) is generated or deployed according to the now-trained machine learning neural network. Thereafter, routine 400 terminates.

According to additional aspects of the discloses subject matter, beyond using an image attractiveness model for improving search results, especially search results that include images, the image attractiveness model may be made to third parties as an API for determining an attractiveness score with an image. In this embodiment, the search engine or other online service may implement and expose a third-party API (application programming interface) by which third parties may submit one or more images and, in response have the service process each image and associate a determined, likely attractiveness score with the image. With reference again to FIG. 1 and by way of illustration, computer user 101 may submit (e.g., by way of computing device 102) an unordered set of images to the search engine service 120 by way of a published API, an HTTP post request, or some other protocol. In response, the search engine service 120 generates a likely attractiveness score for each of the images, by which the images may be ordered, and returns at least the scores to the requesting party, computer user 101.

Figure 6A:
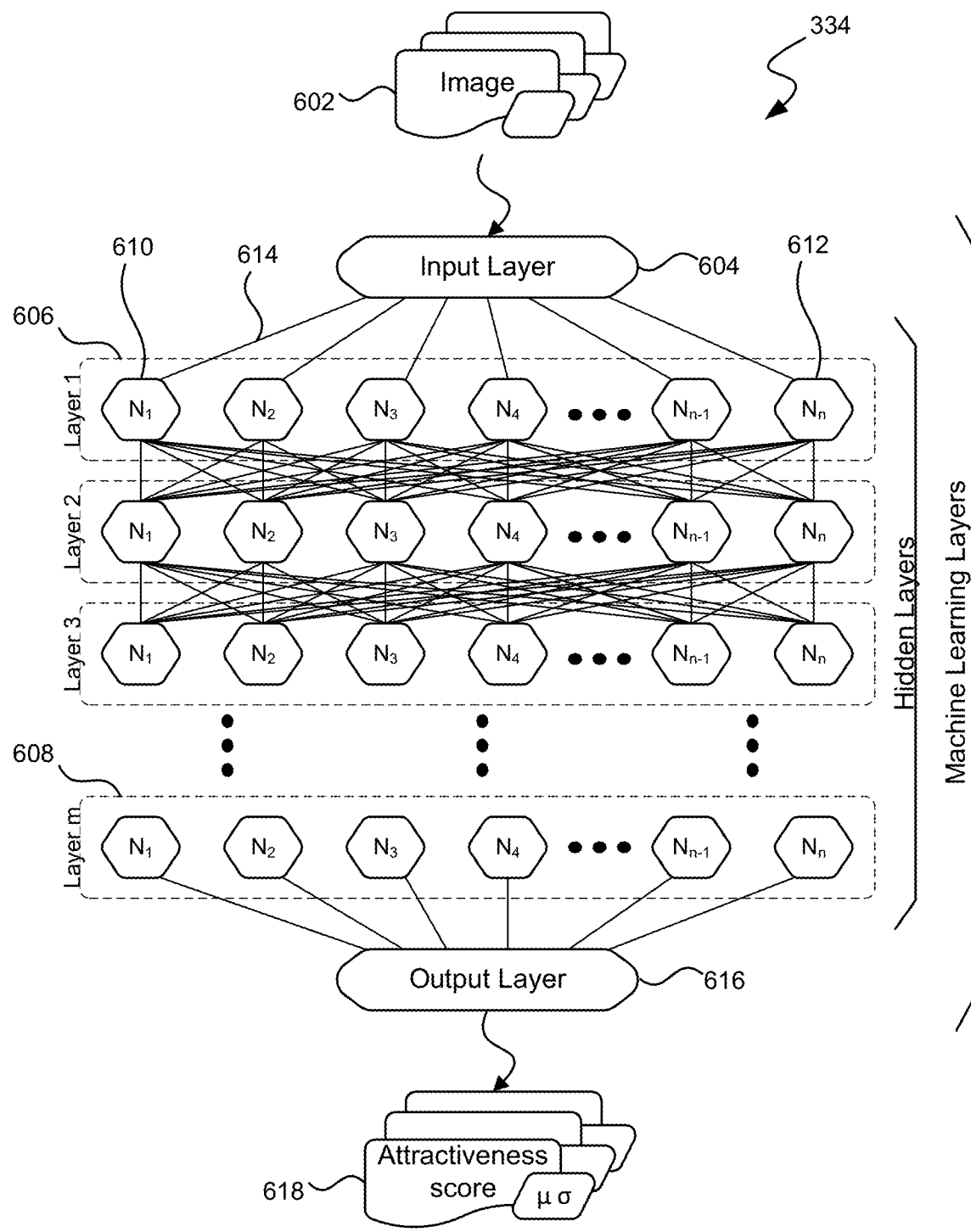
FIG. 6A is a block diagram illustrating an exemplary machine learning neural network that may be suitably trained to determine a likely attractiveness score for a given image, in accordance with aspects of the disclosed subject matter.

Regarding machine learning neural networks and by way of illustration, FIG. 6A is a block diagram illustrating an executable neural network 600 suitable for training and implementation with regard to determining a likely attractiveness score for a given image. As those skilled in the art will appreciate, a neural network, such as the attractiveness model 334, comprises multiple executable layers, including an input layer 604, and output layer 616, and one or more hidden layers. By way of illustration, the attractiveness model 334 includes m hidden layers, including hidden layers 606 and 618.

The input layer 604 accepts the input data (e.g., images such as image tuple 602) for which the attractiveness model 334 will generate a corresponding likely attractiveness score/result (e.g., attractiveness score 618). According to various embodiments, the input data, i.e., input tuple, comprises both an image and corresponding metadata (including image size, resolution, color depth, color histogram, aspect ratio, brightness and/or contrast, and the like). The input layer 604 accepts the input data (in this case content image tuple 602) and, according to one or more predetermined algorithms and/or heuristics, generates an output, i.e., output data. The output data of the input layer/node is distributed (as indicated by the various edges from the input layer 604 to processing nodes, such as edge 614) to the processing nodes, to the first of the hidden layers, layer 606, of the attractiveness model 334. According to one embodiment, the input layer 604 generates a feature vector of the input image of input tuple 602. In one, non-limiting embodiment, the feature vector comprises 1024 floating points corresponding to various elements of the input image.

Figure 6B:
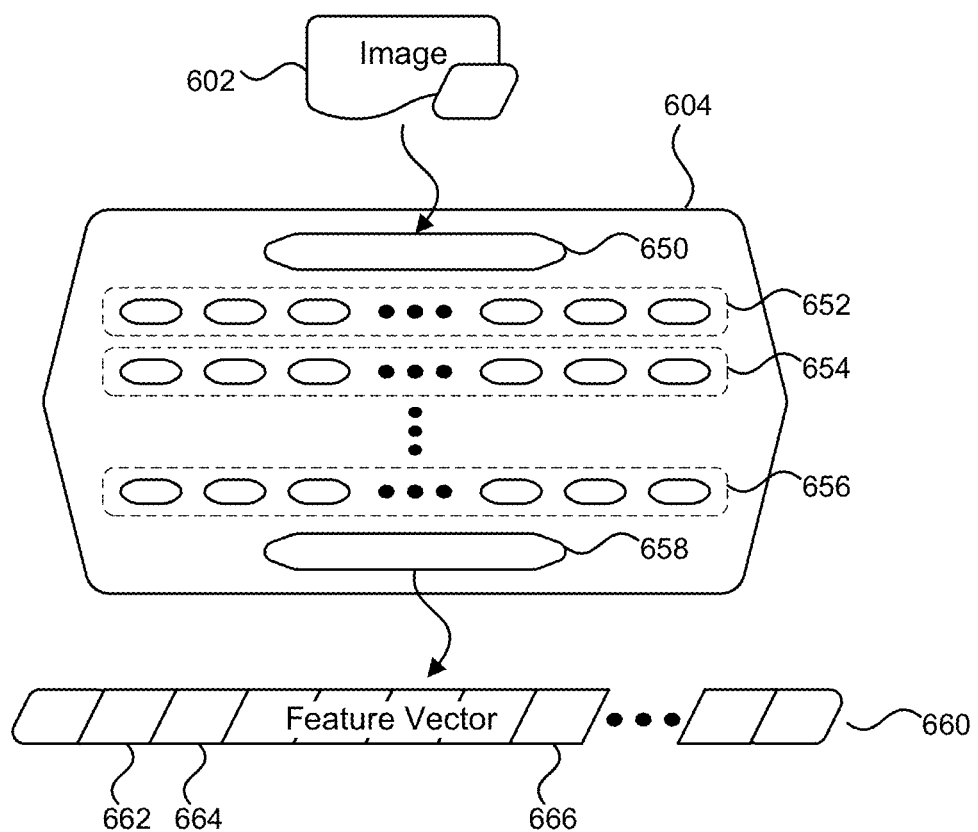
FIG. 6B is a block diagram illustrating an exemplary machine learning neural network implemented as the input layer of FIG. 6A in accordance with aspects of the disclosed subject matter.

Regarding the input layer 604 and according to various embodiments of the disclosed subject matter, in addition to predetermined algorithms and/or heuristics, an input layer, such as input layer 604, an input layer may be implemented as a machine learning neural network or deep network. Turning to FIG. 6B, this figure is a block diagram illustrating an exemplary machine learning neural network implemented as the input layer 604 of FIG. 6A. As will be appreciated, the machine learning input layer 604 includes its own input layer 650, an output layer 658, and one or more hidden layers, such as hidden layers 652-656. As described above, the input to input layer 650 is an image tuple, e.g., image tuple 602, comprising both the image as well as metadata corresponding to that image. In various actual embodiments, the output of the output layer 658 comprises a feature vector 660 corresponding to the image.

As those skilled in the art will appreciate, a feature vector, such as feature vector 660, comprises a set of elements or features, such as features 662-666, derived from the input image and associated parameters. Each feature or element (sometimes referred to a kernels) corresponds to some facet of the input image. As will be further appreciated by those skilled in the art, due to the nature of the machine learning/neural network process, it is often entirely unclear to a human exactly what it is that the machine learning process has identified as being a feature of the input data. In other words, the feature vector comprises data of significant elements of the image and metadata as determined by the machine learning process, where the significance or value of any particular detail is not apparent (or readily apparent) to a human.

In various actual embodiments of the disclosed subject matter, elements of a machine learning process referred to as Inception-BN (where BN refers to batch normalization) is used. As those skilled in the art will appreciate, Inception-BN is an unsupervised machine learning model that is primarily used for image recognition purposes and has been trained, over time, on a significantly corpus of images. However, as the purpose of the disclosed subject matter is not to identify the subject matter of the image but, rather, to identify attractiveness, a complete execution of the Inception-BN model on a given image produces unusable results. According to aspects of the disclosed subject matter, an aborted Inception-BN model is implemented, where only a first number of hidden layers of the complete Inception-BN model are completed before the output of the last executed hidden layer becomes the output of the aborted model. Advantageously, this aborted process captures the product of a massively trained neural network that must first generate a feature vector of an image before turning to the image recognition layers.

Turning back to FIG. 6A, each hidden layer comprises a plurality of processing nodes. By way of illustration and as shown in FIG. 6A, the hidden layers of the attractiveness model 334, such as hidden layer 606, includes n processing nodes $N_1$-$N_n$. While the processing nodes of the first hidden layer 606 typically, though not exclusively, have a single input from the input layer, processing nodes of subsequent hidden layers typically have input values from one or more processing nodes of the previous input layer. In various embodiments, the processing nodes of a hidden layer receive all inputs from processing nodes of a previous layer. As illustrated in the attractiveness model 334, each hidden layer (except for the first hidden layer 606) accept input data/signals from each of the processing nodes of the prior hidden layer, as indicated by the edges proceeding from a processing node of an "upper" hidden layer (e.g., layer 606) to a "lower" hidden layer.

Each processing node of a layer implements one or more "computations" on the input data it receives (whether the processing node receives a single item of input data, or plural items of input data) to produce a single output. These computations may include any number of functions to generate the output data, such as (by way of illustration and not limitation) aggregations, clusterings, transformations, convolutions, combinations, selections and/or filters, mathematical manipulations, linear and multivariate regressions, statistical determinations and predictions, and the like. Moreover, individual items of input data may be weighted such that the item of input data plays a greater or lesser role in the overall computation. Items of input data may also be ignored. As suggested above, hyperparameters and corresponding weightings may also be utilized by all or some of the processing nodes of a given hidden layer.

As will be appreciated by those skilled in the art, one of the interesting aspects of machine learning is that, except for initially established computations of the various processing nodes in a training phase of the machine learning process, people don't have insight or knowledge as to the exact computations that any particular processing node of a hidden layer may utilize. Instead, during the training process of a machine learning process, the machine learning process makes its own determinations as to how to modify each computation to produce better/superior results for the input values it receives.

At the final hidden input layer, e.g., layer 608, the processing nodes provide their output data to the output layer 616. The output layer 616 performs whatever aggregations, calculations, normalizations and/or interpretations of the various items of input data to produce an output value of the model. In the illustrated example, the output layer 616 produces a likely attractiveness score, such as attractiveness score 618, for the input image, such as input image 602. Also included with the attractiveness score is a mean value p corresponding to the input data as well as a variance a with regard to the attractiveness in view of the boundaries (of the side-by-side evaluations).

Figure 7:
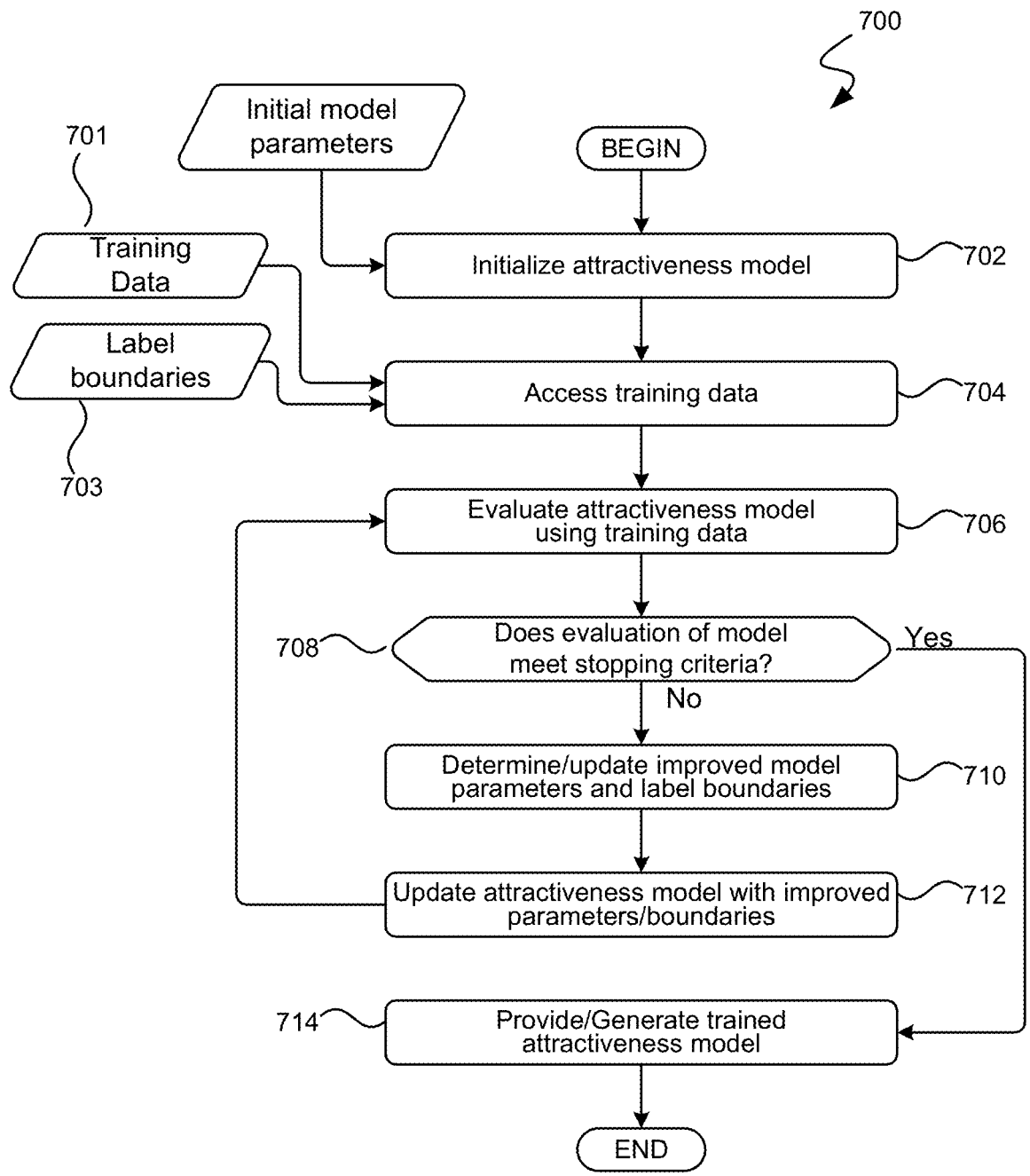
FIG. 7 is a flow diagram illustrating an exemplary routine for training an implementing an attractiveness model in accordance with aspects of the disclosed subject matter.

While FIG. 7 is a flow diagram illustrating an exemplary routine 700 for training an implementing an attractiveness model, particularly one that may be used to determine a likely attractiveness score for a given image or other item of content, in accordance with aspects of the disclosed subject matter. Beginning at block 702, an untrained machine learning attractiveness model is initialized with initial parameters and algorithms for identifying the attractiveness of an image.

At block 704, training data 701 and label boundaries 703 are accessed in order to conduct a supervised learning process of the attractiveness model. According to aspects of the disclosed subject matter, the training data 701 corresponds to the pair-wise images and their results, as well as the label boundaries (left, left slightly better, equal, etc.). At block 706, the attractiveness model is evaluated through the use of the training data 701 and corresponding label boundaries 703. As suggested above in regard to routine 400, this may include multiple iterations of applying a training set of the training data 701 to the machine learning, attractiveness model until an acceptable error tolerance is reached.

At block 706, a determination is made as to whether an evaluation of the attractiveness model meets predetermined stopping criteria (i.e., whether the error threshold is within predetermined tolerances.) This determination is made through the use of a validation set of the training data 701 to determine whether the model has been sufficiently trained to produce desired results. If the stopping criteria is not met, the routine 700 proceeds to block 710.

At block 710, improved model parameters are determined, as well as adjustments that may be made to the label boundaries. These updates are made throughout the various levels of the machine learning model, often by modifying weights applied in any given convolution node, in order to affect the output of the various nodes and layers, and more generally to affect the output of the attractiveness model. Techniques such as maximum likelihood estimation may be used to adjust the values of likely parameters to achieve the desired results, i.e., a more accurate prediction of the attractiveness of an image or other item of content. At block 712, the parameters are updated according to the various determinations and the routine 700 returns to block 706 for additional supervised training as described above.

Returning to block 708, when a determination is made that the evaluation of the attractiveness model meets the predetermined stopping criteria, the routine 700 proceeds to block 714. At this point, the parameters of the attractiveness model are such that the model outputs attractiveness scores that meet the desired level of accuracy. However, in an effort to make processing of data (images) more efficient, the attractiveness model is then output in a form that operates efficiently. This may include analyzing the various nodes of the various levels to optimize the processing (or lack of processing) at any given level, combining identical functions, and the like. Once the attractiveness model is output, the routine 700 terminates.

Regarding routines 200, 400, 500 and 700 described above, as well as other processes that are described herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the routines and/or processes include various novel features of the disclosed subject matter, other steps (not listed) that support key elements of the disclose subject matter set forth in the routines/processes may also be included and carried out in the execution of these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 9 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with these routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer-executable instructions and data to a computing device for execution by one or more processors via various transmission means and mediums, including carrier waves and/or propagated signals, for purposes of this disclosure computer readable media expressly excludes carrier waves and/or propagated signals.

Figure 8:
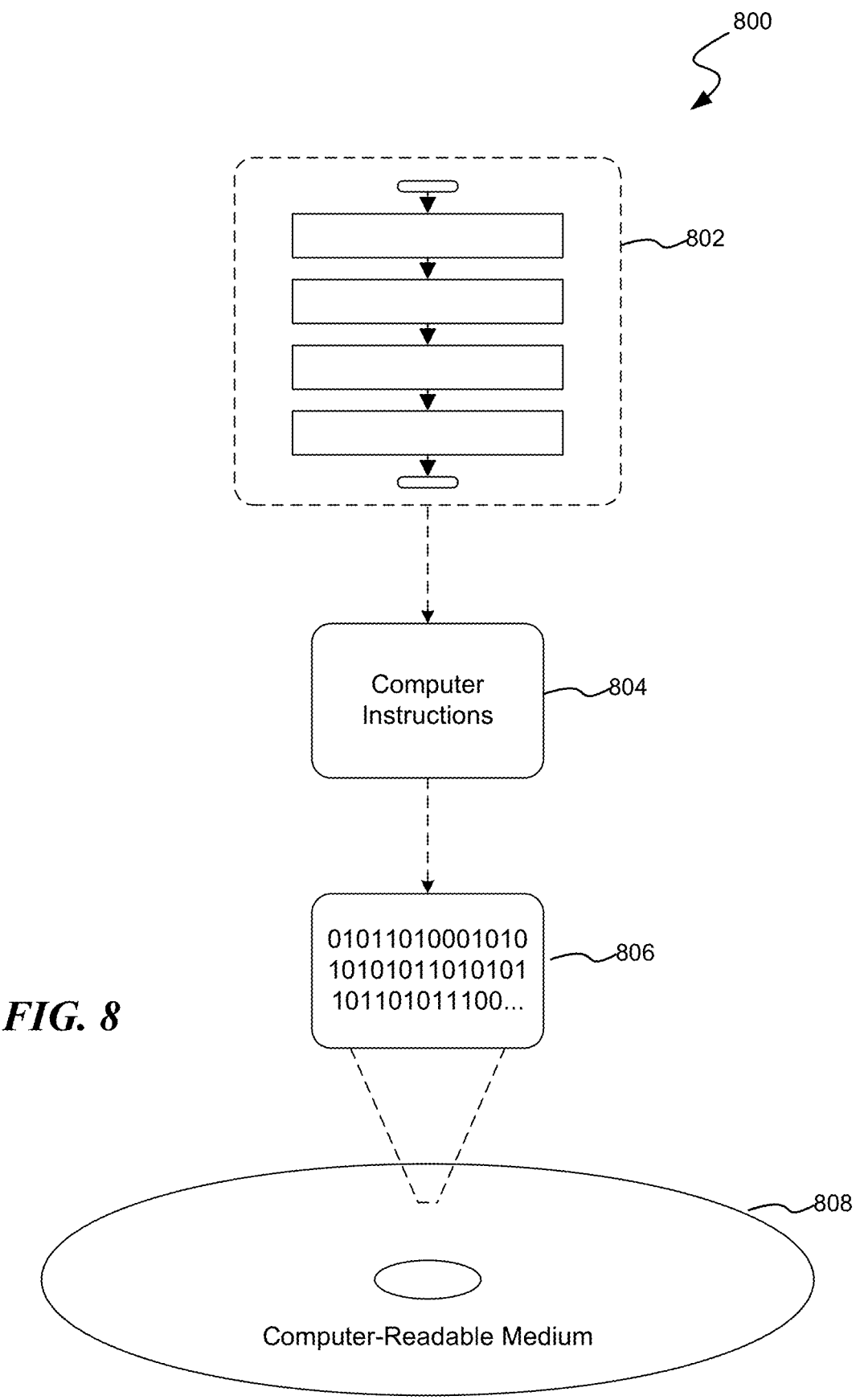
FIG. 8 is a block diagram illustrating an exemplary computer readable medium encoded with instructions for implementing aspects of the disclosed subject matter.

Regarding computer readable media, FIG. 8 is a block diagram illustrating an exemplary computer readable medium encoded with instructions illustrating an exemplary computer readable medium bearing computer-executable instruction that, in execution, implement aspects of the disclosed subject matter, particularly in regard to providing search engine services according to aspects of the disclosed subject matter. More particularly, the implementation 800 comprises a computer-readable medium 808 (e.g., a CD-R, DVD-R or a platter of a hard disk drive), on which is encoded computer-readable data 806. This computer-readable data 806 in turn comprises a set of computer instructions 804 configured to operate according to one or more of the principles set forth herein.

In one such embodiment 702, the processor-executable instructions 804 may be configured to perform a method, such as at least some of exemplary methods 200, 400 or 500, for example. In another such embodiment, the processor-executable instructions 804 may be configured to implement a system on a computing device, such as at least some of the exemplary, executable components of system 118 of FIG. 9, as described below. Many such computer readable media may be devised, by those of ordinary skill in the art, which are configured to operate in accordance with the techniques presented herein.

Figure 9:
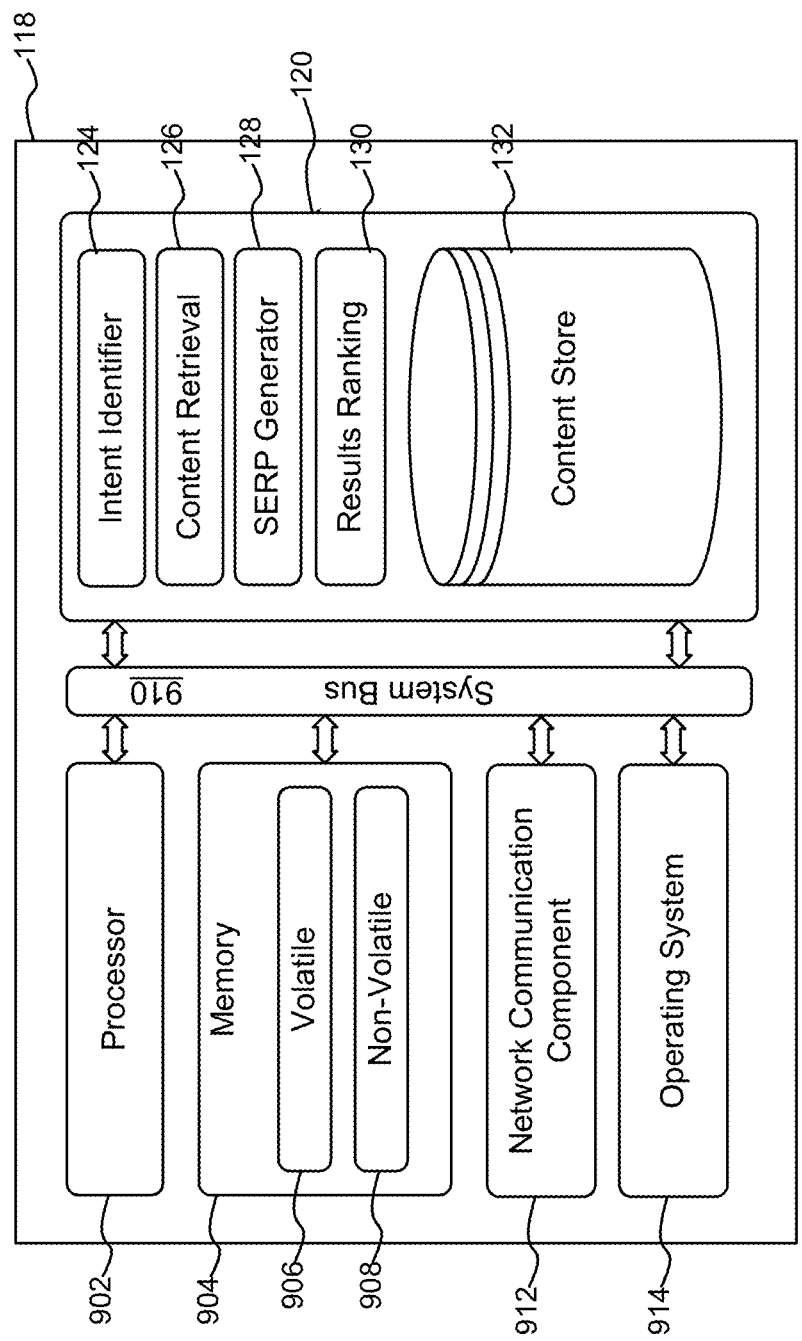
FIG. 9 is a block diagram illustrating an exemplary computing system suitably configured to provide an online search engine service that responds to search queries in accordance with aspects of the disclosed subject matter.

Turning now to FIG. 9, FIG. 9 is a block diagram illustrating an exemplary computing system configured to provide a search engine service 120 according to aspects of the disclosed subject matter. A suitably configured hosting computing device, such as computing device 118, may comprise any of a number of computing system including, by way of illustration and not limitation, a desktop computer, a laptop/notebook computer, mini- and mainframe computing devices, network servers, and the like. Generally speaking, irrespective of the particular type of computing system, the computing system 118 typically includes one or more processors (or processing units), such as processor 902, and further includes at least one memory 904. The processor 902 and memory 904, as well as other components of the computing system 118, are interconnected by way of a system bus 910.

As will be appreciated by those skilled in the art, the memory 904 typically (but not always) comprises both volatile memory 906 and non-volatile memory 908. Volatile memory 906 retains or stores information so long as the memory is supplied with power. In contrast, non-volatile memory 908 is capable of storing (or persisting) information even when a power supply is not available. Generally speaking, RAM and CPU cache memory are examples of volatile memory 906 whereas ROM, solid-state memory devices, memory storage devices, and/or memory cards are examples of non-volatile memory 908.

As will also appreciated by those skilled in the art, the processor 902 executes instructions retrieved from the memory 904, from computer-readable media, such as computer-readable media 800 of FIG. 8, and/or other executable components in carrying out various functions of implementing digital assistant services. The processor 902 may be comprised of any of a number of available processors such as single-processor, multi-processor, single-core units, and multi-core units, which are well known in the art.

The exemplary system 900 further includes an operating system (OS) 914. As those skilled in the art will appreciate, the operating system 914 is system software that manages computer hardware and software resources, and further provides common services for computer programs. The operating system 914 is a component of the system software in a computer system. Application programs (not shown) usually require an operating system to function as these programs reference one or more services provided by the OS, as well as rely upon the OS to initialize execution of these programs.

Further still, the illustrated computing system 118 typically includes a network communication component 912 for interconnecting this computing device with other devices and/or services over a computer network, such as network 108. The network communication component 912, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication component, such as network communication component 912, is typically comprised of hardware and/or firmware components (and may also include or comprise executable software components) that transmit and receive digital and/or analog signals over a transmission medium (i.e., the network.)

The exemplary computing system 118 further includes a search engine component 120. As described above, the search engine 120 comprises various logical and/or executable components or modules for responding to a search query from a computer user. These executable components including, by way of illustration but not limitation, an intent identifier module 124, a content retrieval module 126, a SERP (SEarch Results Page) generator 128, and a results ranking module 130. Also, typically maintained by a search engine 120 is a content store 132.

Typically, though not exclusively, the content store 128 comprises an indexed data store referencing content that may be provided to a computer user in response to search query. According to various embodiments of the disclosed subject matter, the content store may store items of content (e.g., text content, audio content, images, video content, data, etc.) that may be provided to a computer user in response to a search query. Additionally or alternatively, the content store may include references or hyperlinks (e.g., uniform resource locators or URLs and/or uniform resource identifiers or URIs) to content.

In operation/execution, the intent identifier 124 determines the user intent of a received search query. As discussed above in regard to FIG. 3, the intent identifier 124 comprises multiple concurrent or near-concurrent executable modules that must quickly execute to in order to provide relevant query results in order to respond to the requesting computer user in a reasonable amount of time. These executable modules may include a user preference module 308 that identifies user preferences with regard to choices that may be made by the overall intent identification process, an n-grams identifier module 310 that converts the textual components of the search query to n-grams that may be used to map the search query to one or more user intents, an executable importance module 312 that associates importance weightings with the various entities that may be identified by the search query, and an executable tokens identifier module 314 that parses the search query for the various tokens (as may be determined according to white space and/or punctuation) for use in identifying the various elements of the search query. The results of each of the executable modules is processed and combined by the intent identifier module 124 to determine the query intent of a given search query.

The content retrieval module 126, in execution on the computing system 118, obtains content from the content store to in response to the search query. As will be appreciated by those skilled in the art, the content store 132 comprises content obtained and/or identified from numerous network-accessible sites and sources on the network 108. Further, gathering such content is typically the province of a so-called Internet spider or Web crawler, that searches throughout the Internet/network for content. Information regarding the "located" content is typically stored in an index, where the content store 132 is an indexed content store suitable for ready and rapid access according to various key terms and phrases (typically corresponding to entities). Snippets that describe the items of content in the content store 132 may also be associated with the corresponding content in the content store. The items of content stored in the content store may comprise copies of the items located throughout the network and/or references (e.g., URLs—uniform resource locators—and URIs—uniform resource identifiers) to these items of content located throughout the network 108. According to aspects of the disclosed subject matter, the identified set of content includes one or more images.

The results ranking module 130, in execution on the hosting the computing system 118, determines a score for the various items of content that have been accessed or retrieved in response to the search query. As indicated above, this score, an overall score, is typically determined as a combination of various other scores, including a relevance score that may be made by a relevance module, a freshness score regarding the item's freshness, and an attractiveness score, as determined by an attractiveness model 334 discussed above. The results ranking module 130 combines the scores according to predetermined heuristics to determine an overall score for each item of item, including images.

The SERP generator 128, in execution, generates one or more search results according to the obtained content. Typically, though not exclusively, the SERP generator selects the highest scoring content for inclusion in first search results pages presented to the computer user, in a manner that items of content that are deemed to be the highest scoring content are presented first to the computer user over content that is deemed less high scoring.

Regarding the various components of the exemplary computing system 118, those skilled in the art will appreciate that many of these components may be implemented as executable software modules stored in the memory of the computing device, as executable hardware modules and/or components (including SoCs—system on a chip), or a combination of the two. Indeed, components may be implemented according to various executable embodiments including executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

Moreover, in certain embodiments each of the various components of the exemplary computing system 188 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network as in known in the art.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for responding to a search query, the method comprising:
   receiving a search query from a computer user;
   determining a query intent of the search query;
   identifying a set of content related to the query intent, the set of content comprising at least one image;
   determining an overall score for each item of the set of content according to a determined relevance value of the item to the query intent, and wherein the overall score of the least one image comprises an attractiveness value that is calculated by evaluating pairs of images, wherein a pair of images is compared no more than once during a set number of rounds of evaluation;
   generating a search results page according to the overall scores, wherein the search results page includes the at least one image; and
   returning the search results page to the computer user in response to the search query.

2. The computer-implemented method of claim 1, wherein the set of content related to the query intent comprises a plurality of images; and
   wherein the overall scores of the at least one image is greater than another of the plurality of images according to the attractiveness value of the at least one image as compared to an attractiveness value of another of the plurality of images.

3. The computer-implemented method of claim 2, wherein the overall score for each item of the set of content is determined according to a determined relevance value of the item to the query intent and a determined freshness value.

4. The computer-implemented method of claim 2, wherein the attractiveness value is determined according to a machine learning neural network model.

5. The computer-implemented method of claim 4, further comprising training the machine learning neural network, comprising:
   accessing training data for training the machine learning neural network;
   stochastically selecting a training set and validation set from the training data; and
   repeatedly:
      processing the training set via the machine learning neural network;
      applying a loss function in view of the training set to determine an error rate with the machine learning neural network; and
      updating aspects of the machine learning neural network;
   until the error rate determined by the lost function with regard to the training set is within a desired error tolerance.

6. The computer-implemented method of claim 5, further comprising:
   repeatedly:
      processing the validation set via the machine learning neural network;
      applying a loss function in view of the validation set to determine an error rate with the machine learning neural network;
      updating aspects of the machine learning neural network; and
      repeating the steps of repeatedly processing the training set, applying a loss function, and updating aspects of the machine learning neural network;
   until the error rate determined by the lost function with regard to the validation set is within a desired error tolerance.

7. The computer-implemented method of claim 6, wherein accessing training data for training the machine learning neural network comprises:
   accessing a corpus of images; and
   determining a relative ordering of the images of the corpus of images.

8. The computer-implemented method of claim 7, wherein determining a relative ordering of the images of the corpus of images comprises:
   selecting image pairs from the corpus of images;
   conducting a multi-round Swiss Tournament with the image pairs;
   wherein each competition between images of an image pair is determined by a human judge based on the relative attractiveness between the two images of the image pair;
   wherein the results of a competition between images of an image pair result in a score being added to a cumulative score for each image of the image pair; and
   determining the relative ordering of the images of the corpus of images according to the cumulative scores at the completion of the Swiss Tournament.

9. A computer-readable medium bearing computer-executable instructions which, when executed on a computing system comprising at least a processor, carry out a method for responding to a search query, the method comprising:
   receiving a search query from a computer user;
   determining a query intent of the search query;
   identifying a set of content related to the query intent, the set of content comprising at least one image;
   determining an overall score for each item of the set of content according to a determined relevance value of the item to the query intent, and wherein the overall score of the least one image comprises an attractiveness value that is calculated by evaluating pairs of images, wherein a pair of images is compared no more than once during a set number of rounds of evaluation;
   generating a search results page according to the overall scores, wherein the search results page includes the at least one image; and
   returning the search results page to the computer user in response to the search query.

10. The computer-readable medium of claim 9, wherein the set of content related to the query intent comprises a plurality of images; and
   wherein the overall scores of the at least one image is greater than another of the plurality of images according to the attractiveness value of the at least one image as compared to an attractiveness value of another of the plurality of images.

11. The computer-readable medium of claim 10, wherein the overall score for each item of the set of content is determined according to a determined relevance value of the item to the query intent and a determined freshness value.

12. The computer-readable medium of claim 10, wherein the attractiveness value is determined according to a machine learning neural network model.

13. The computer-readable medium of claim 12, the method further comprising training the machine learning neural network, comprising:
   accessing training data for training the machine learning neural network;
   stochastically selecting a training set and validation set from the training data; and
   repeatedly:
      processing the training set via the machine learning neural network;
      applying a loss function in view of the training set to determine an error rate with the machine learning neural network; and
      updating aspects of the machine learning neural network;
   until the error rate determined by the lost function with regard to the training set is within a desired error tolerance.

14. The computer-readable medium of claim 13, the method further comprising:
   repeatedly:
      processing the validation set via the machine learning neural network;
      applying a loss function in view of the validation set to determine an error rate with the machine learning neural network;
      updating aspects of the machine learning neural network; and
      repeating the steps of repeatedly processing the training set, applying a loss function, and updating aspects of the machine learning neural network;
   until the error rate determined by the lost function with regard to the validation set is within a desired error tolerance.

15. The computer-readable medium of claim 14, wherein accessing training data for training the machine learning neural network comprises:

accessing a corpus of images; and determining a relative ordering of the images of the corpus of images.

16. The computer-readable medium of claim 15, wherein determining a relative ordering of the images of the corpus of images comprises:

selecting image pairs from the corpus of images;

conducting a multi-round Swiss Tournament with the image pairs;

wherein each competition between images of an image pair is determined by a human judge based on the relative attractiveness between the two images of the image pair;

wherein the results of a competition between images of an image pair result in a score being added to a cumulative score for each image of the image pair; and determining the relative ordering of the images of the corpus of images according to the cumulative scores at the completion of the Swiss Tournament.

17. A computing system implementing a search engine configured to respond to a search query, the computing system comprising a processor and a memory, where the processor executes instructions retrieved from the memory in responding to a search query, and wherein the computing system further comprises:

an executable intent identifier that, in execution on the computing system, evaluates a search query received from a computer user to determine a query intent of the search query;

an executable content retrieval component that, in execution on the computing system, identifies a set of content related to the query intent from a content store, the set of content comprising at least one image;

an executable results ranking component that, in execution on the computing system, determines an overall score for each item of the set of content according to a determined relevance value of the item to the query intent, wherein the overall score of the least one image comprises an attractiveness value that is calculated by evaluating pairs of images, wherein a pair of images is compared no more than once during a set number of rounds of evaluation; and an executable search results page generator that, in execution on the computing system, generates a search results page according to the overall scores, wherein the search results page includes the at least one image;

wherein the search results page is returned to the computer user in response to the search query.

18. The computing system of claim 17, wherein:

the set of content related to the query intent comprises a plurality of images;

the overall scores of the at least one image is greater than another of the plurality of images according to the attractiveness value of the at least one image as compared to an attractiveness value of another of the plurality of images.

19. The computing system of claim 18, wherein the overall score for each item of the set of content is determined according to a determined relevance value of the item to the query intent and a determined freshness value.

20. The computer-readable medium of claim 18, wherein the results ranking component is a machine learning neural network model, and wherein training the machine learning neural network, comprising:

accessing training data for training the machine learning neural network;

stochastically selecting a training set and validation set from the training data; and repeatedly:

processing the training set via the machine learning neural network;

applying a loss function in view of the training set to determine an error rate with the machine learning neural network; and updating aspects of the machine learning neural network;

until the error rate determined by the lost function with regard to the training set is within a desired error tolerance.

* * * * *